Sept. 3, 1957     D. R. FERRIS     2,805,027
AUTOMATIC RADIATOR SHUTTER CONTROL
Filed Feb. 23, 1956
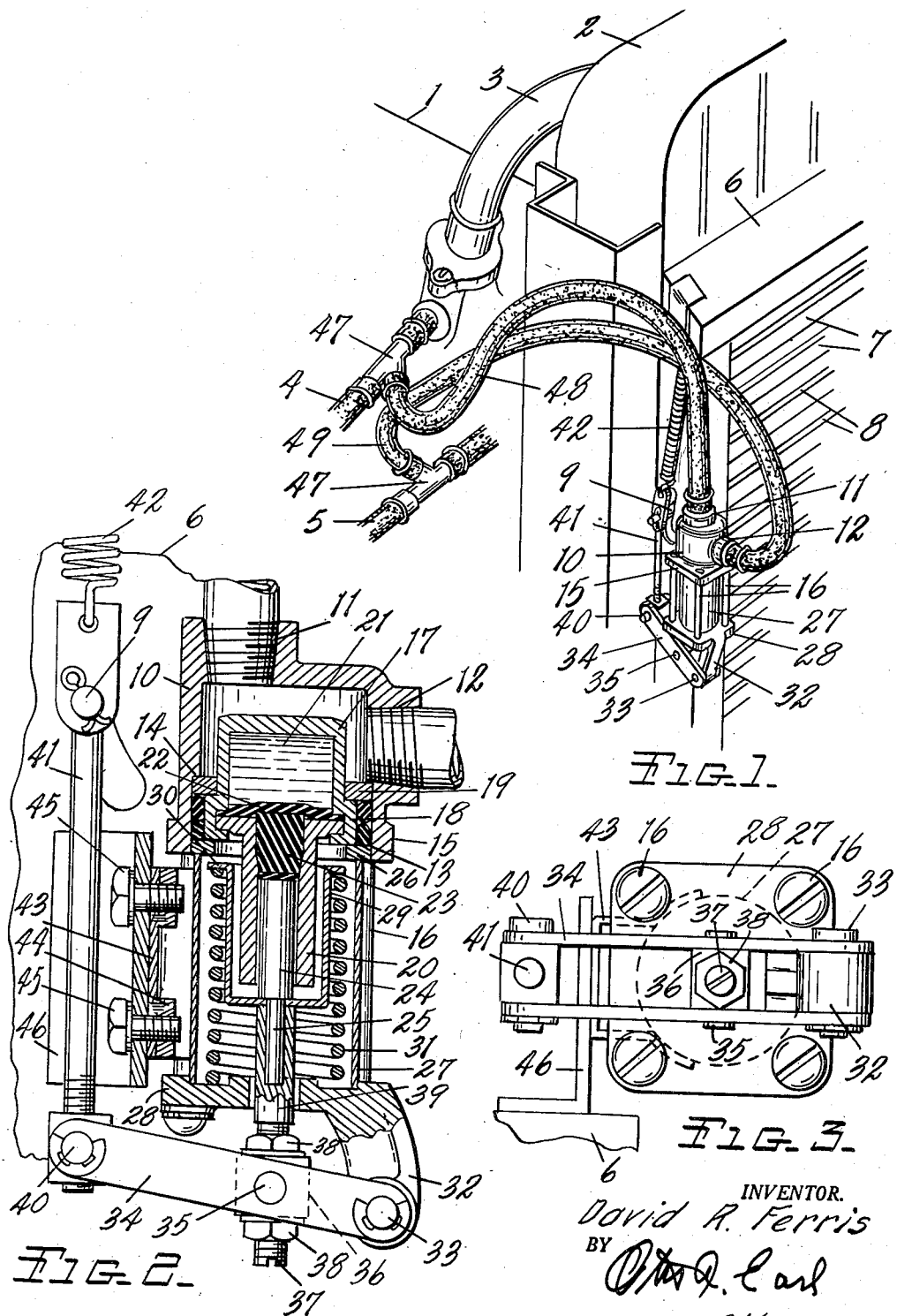
INVENTOR.
David R. Ferris
BY
Otto Q. Carl
Attorney.

United States Patent Office 2,805,027
Patented Sept. 3, 1957

2,805,027

AUTOMATIC RADIATOR SHUTTER CONTROL

David R. Ferris, Cadillac, Mich., assignor to Kysor Heater Company, Cadillac, Mich.

Application February 23, 1956, Serial No. 567,326

5 Claims. (Cl. 236—35.2)

This invention relates to improvements in automatic radiator shutter control.

The principal objects of this invention are:

First, to provide an inexpensive actuating mechanism for automatically opening and closing a shutter over the radiator of an automotive vehicle in response to changes in the temperature of the engine.

Second, to provide a shutter control and actuator that is responsive to the temperature of the coolant liquid in a liquid cooled engine.

Third, to provide a shutter actuating mechanism that is entirely self contained and which requires only the attachment of two small liquid conduits from the coolant system of an engine to control and actuate the mechanism in response to changes in engine temperature.

Fourth, to provide shutter actuating mechanism in which the expansive force of a thermally expansible material operates directly to move a radiator shutter to open position.

Other objects and advantages of the invention will be apparent from a consideration of the following description and claims. The drawings of which there is one sheet illustrate a highly practical form of the shutter actuating mechanism and an installation thereof on the radiator of an automobile.

Fig. 1 is a fragmentary perspective view of the engine, radiator and radiator shutter of an automotive vehicle with the shutter actuating mechanism of the invention mounted thereon.

Fig. 2 is a vertical cross sectional view through the shutter actuator.

Fig. 3 is a fragmentary bottom plan view of the actuator and its connection to the shutter frame.

Various automatic shutter actuating mechanisms have been devised but heretofore these mechanisms have required the existence and use and control of some secondary source of power such as hydraulic or air pressure for performing the work of mechanically opening and closing the shutters. Various types of thermostatic elements have been used to regulate or control the power mechanism and these installations have been satisfactory on larger vehicles such as trucks and buses which have compressed air or hydraulic pressure systems incorporated therein. However these prior mechanisms have been economically unfeasible on passenger automobiles with the result that very few passenger automobiles have been equipped with automatic shutters for the radiator even through it has long been recognized that the efficiency of an automobile engine can be substantially increased if the temperature of the engine is controlled. While thermostatic control of the circulation of cooling liquid provides some temperature control for the engine a much closer control can be obtained particularly in cold weather when the circulation through the radiator and over the outside of the engine is controlled by a shutter.

In Fig. 1 there is illustrated a portion of an automobile engine 1 and its associated radiator 2. The cooling jacket of the engine is connected through the outlet hose 3 to the upper tank of the radiator as is common and a heater hose connection 4 for diverting part of the hot water to the automobile heater connects to the coolant system as is also common. The return conduit from the heater is indicated at 5 and a shutter assembly for the radiator having a frame 6 and a plurality of tiltable louvers 7 is mounted on the front of the radiator. The louvers 7 are tiltably adjustable on transversely extending pivot axes 8 and the louvers are connected for simultaneous actuation by a crank arm 9 projecting through the side frame of the shutter. Shutter and heater installations of this type are well known and so are not described in greater detail.

The shutter actuating mechanism of the invention is mounted on the side frame of the shutter below the crank arm 9 and consists of a water jacket member 10 having a threaded inlet 11 in the end and an outlet connection 12 on the side. The water jacket member 10 has an open lower end 13 that is internally shouldered as at 14. A flange 15 around the lower end of the water jacket is drilled and tapped for the reception of the connecting screws 16 as will be described in greater detail.

Positioned within the water jacket member 10 and spaced from the internal walls thereof is a thermo element 17 having a hollow cylindrical body with an external flange 18 at its outer end opposed to the shoulder 14 in the water jacket. A retaining washer 19 supports the flange 18 from the shoulder 14. A cylindrical neck 20 of reduced diameter projects from the flange 18 of the thermo unit through the open end of the water jacket. Interiorly the cylindrical body 17 of the thermo unit is filled with a mass of semi liquid thermally expansible material 21. A flexible wall or diaphragm 22 extends across the face of the expansible material and over the end of the cylindrical neck 20 to seal the expansible material in the cylindrical body. A plug or piston 23 of deformable rubber is positioned within the cylindrical neck and in engagement with the wall 22. The lower end of the cylindrical neck forms a bore and guide for the metallic piston 24 that has a push pin 25 of reduced diameter on its lower end. Thermo elements of this type are commercially available and the details of the elements are not claimed or described in greater detail for this reason.

The thermo element is retained in the water jacket first by a second retaining washer 26 that bears against the outer edge of the flange 18 and secondly by a cylindrical sleeve 27 that bears against the washer. A generally rectangular end plate 28 is fitted over the lower end of the sleeve 27 and the previously mentioned screws 16 function to clamp the sleeve between the end plate and the water jacket. Positioned within the sleeve 27 and over the projecting neck 20 of the thermo element is a cylindrical cup 29 and having an outturned flange 30 on its upper end. The bridge of the cup 29 seats on the piston 24 with the push pin 25 projecting axially therethrough while a return spring 31 is compressed between the flange 30 and the end plate 28 to bias the piston 24 and the thermally expansible material 21 to retracted position.

Extending and retracting motion of the piston 24 is imparted to the shutter louvers by means of direct mechanical linkage consisting first of a bracket 32 formed on the end plate 28 and carrying a pivot 33 for a lever 34. Intermediate of its ends the lever 34 is provided with a pivotal connection 35 to a yoke block 36 with a threaded pin 37 extending adjustably therethrough. The pin 37 is adjustably clamped to the yoke block by lock nuts 38 and has a cylindrical stem 39 that extends through the end plate 28 and fits over the push pin 25 on the piston. The swinging end of the lever 34 is pivotally connected as at 40 to a connecting rod 41 that extends upwardly and is pivotally connected at its upper end to the previously described actuating crank arm 9 of the shutter assembly. A tension spring 42 continuously biases the shutter and the shutter actuating linkage to shutter closing position and thus assists the action of the spring 31 in returning the piston 24 to retracted position as the mass of thermally expansible material 21 cools.

The actuating mechanism is mounted on the side frame of the shutter by means of a U-shaped bracket 43 (see Fig. 3) welded to the side of the sleeve 27 and having threaded nuts 44 secured to its inner surface. Screws 45 clamp the bracket 43 to an angular bracket 46 welded or otherwise suitably secured to the frame 6 of the shutter.

In order to control and energize the actuating mechanism in response to change in the temperature of the engine Y couplings 47 are inserted in the heater delivery hose 4 and return hose 5. The flow of heated coolant liquid from the engine to the heater is partially diverted through a relatively small delivery hose 48 that extends to the inlet connection 11 of the water jacket 10. The heated coolant liquid circulates around the cylindrical body 17 of the thermo element and is returned through the outlet connection 12 and a return hose 49 to the return hose 5 from the heater. Obviously the mass of thermally expansible material 21 will respond to changes of temperature of the coolant liquid in the packet 10 and will correspondently actuate the piston 24 and the connecting linkage to the shutter louvers. A relatively small amount of coolant liquid circulated through the water jacket 10 will function to operate the actuating mechanism and it is relatively simple and inexpensive to connect the small supply and return hoses 48 and 49 between the radiator coolant system of the engine and the shutter actuating mechanism. When the temperature of the engine stabilizes in operation the position of the shutters and the shutter actuating mechanism also stabilizes until a change in operating conditions requires readjustment of the shutters.

When the engine is stopped circulation through the water jacket 10 is stopped so the thermo element 17 rapidly cools in cold weather and the combined action of the springs 31 and 42 closes the shutters and the radiator opening before the larger mass of the engine block has cooled and thus prevents the flow of snow and cool air through the radiator and the engine compartment.

Having thus described the invention, what is claimed to be new and is desired to be secured by Letters Patent is:

1. Shutter actuating mechanism for an automobile having a liquid cooled engine and a radiator with a shutter arranged to open and close to the flow of air through the radiator comprising a frame for said shutter, an actuating member connected to open and close said shutter and projecting through said frame, a water jacket having inlet and outlet connections and an open side with an internal shoulder therearound, a thermal element having one end positioned in said jacket in spaced relation to the inner walls thereof and having an external flange opposed to said shoulder, a neck on said element projecting through the open side of said jacket, a sleeve surrounding said neck, an end plate positioned over the end of said sleeve, screws clamping said end plate and sleeve axially against said element to clamp said element against said shoulder, means sealing said jacket around said element, a bracket supporting said sleeve and jacket on said frame in fixed relation to said shutter, a mass of semi-solid thermally expansible material in said one end of said element, a flexible diaphragm covering said material and extending yieldably across the inner end of said neck, a piston slidable in said neck and bearing against said diaphragm and projecting from the open end of the neck and through said end plate, a collar bearing axially inwardly on said piston, a spring compressed between said end plate and said collar, a lever pivoted on said end plate and pivotally connected intermediate of its ends to the end of said piston to be moved thereby, a link connecting the swinging end of said lever to said actuating member, a spring connected between said frame and said actuating member to bias said shutter to closed position, and liquid conduits connected between said connections on said jacket and the cooling system of said engine to form a circulating system for liquid from the engine through the jacket.

2. Shutter actuating mechanism for an automobile having a liquid cooled engine and a radiator with a shutter arranged to open and close to the flow of air through the radiator comprising an actuating member connected to open and close said shutter, a water jacket having inlet and outlet connections and an open side with an internal shoulder therearound, a thermal element having one end positioned in said jacket in spaced relation to the inner walls thereof and having an external flange opposed to said shoulder, a neck on said element projecting through the open side of said jacket, a sleeve surrounding said neck, an end plate positioned over the end of said sleeve, screws clamping said end plate and sleeve axially against said element to clamp said element against said shoulder, means sealing said jacket around said element, a bracket supporting said sleeve and in fixed relation to said shutter, a mass of semisolid thermally expansible material in said one end of said element, a flexible diaphragm covering said material and extending yieldably across the inner end of said neck, a piston slidable in said neck and bearing against said diaphragm and projecting from the open end of the neck and through said end plate, a collar bearing axially inwardly on said piston, a spring compressed between said end plate and said collar, a lever pivoted on said end plate and pivotally connected intermediate of its ends to the end of said piston to be moved thereby, a link connecting the swinging end of said lever to said actuating member, a spring connected to bias said shutter to closed position, and liquid conduits connected between said connections on said jacket and the cooling system of said engine to form a circulating system for liquid from the engine through the jacket.

3. Shutter actuating mechanism for an automobile having a liquid cooled engine and a radiator with a shutter arranged to open and close to the flow of air through the radiator comprising an actuating member connected to open and close said shutter, a water jacket having inlet and outlet connections, a thermal element having one end positioned in said jacket in spaced relation to the inner walls thereof, a neck on said element projecting through the side of said jacket, a sleeve surrounding said neck, an end plate positioned over the end of said sleeve, screws clamping said end plate and sleeve axially against said jacket, means sealing said jacket around said element, a bracket supporting said sleeve in fixed relation to said shutter, a mass of semi-solid thermally expansible material in said one end of said element, a piston slidable in said neck and opposing expansion of said material and projecting from the open end of the neck, a collar bearing axially inwardly on said piston, a spring compressed between said end plate and said collar, a lever pivoted on said end plate and pivotally connected intermediate of its ends to a cap fitted over the end of said piston to be moved thereby, a link connecting the swinging end of said lever to said actuating member, a spring connected to bias said shutter to closed position, and liquid conduits connected between said connections on said jacket and the cooling system of said engine to form a circulating system for liquid from the engine through the jacket.

4. Shutter actuating mechanism for an automobile having a liquid cooled engine and a radiator with a shutter arranged to open and close to the flow of air through the radiator comprising an actuating member connected to open and close said shutter, a water jacket having inlet and outlet connections and an open side, a thermal element having one end positioned in said jacket in spaced relation to the inner walls thereof, a neck on said element projecting through the open side of said jacket, a sleeve surrounding said neck, an end plate positioned over the end of said sleeve, screws clamping said end plate and sleeve axially against said element to clamp said element on said jacket, means sealing said jacket around said element, a bracket supporting said sleeve in fixed relation to said shutter, a mass of semi-solid thermally expansible material in said one end of said element, a flexible diaphragm covering said material and extending yieldably across the inner end of said neck, a piston slidable in said neck and bearing against said diaphragm and projecting from the open end of the neck, a collar bearing axially inwardly on said piston, a spring compressed between said end plate and said collar, a lever pivoted on said end plate and connected intermediate of its ends to the end of said piston to be moved thereby, a link connecting the swinging end of said lever to said actuating member, a spring connected to said actuating member to bias said shutter to closed position, and liquid conduits connected between said connections on said jacket and the cooling system of said engine to form a circulating system for liquid from the engine through the jacket.

5. Shutter actuating mechanism for an automobile having a liquid cooled engine and a radiator with a shutter arranged to open and close to the flow of air through the radiator comprising an actuating member connected to open and close said shutter, a water jacket having inlet and outlet connections and an open side, a thermal element having one end positioned in said jacket in spaced relation to the inner walls thereof, a neck on said element projecting through the open side of said jacket, a sleeve surrounding said neck, an end plate positioned over the end of said sleeve, screws clamping said end plate and sleeve axially against said element to clamp said element on said jacket, means sealing said jacket around said element, a bracket supporting said sleeve in fixed relation to said shutter, a mass of semi-solid thermally expansible material in said one end of said element, a piston slidable in said neck and opposed to said material and projecting from the open end of the neck, a collar bearing axially inwardly on said piston, a spring compressed between said end plate and said collar, a lever pivoted on said end plate and connected intermediate of its ends to the end of said piston to be moved thereby, a link connecting the swinging end of said lever to said actuating member, a spring connected to bias said shutter to closed position, and liquid conduits connected between said connections on said jacket and the cooling system of said engine to form a circulating system for liquid from the engine through the jacket.

References Cited in the file of this patent

UNITED STATES PATENTS

| | | |
|---|---|---|
| 1,251,214 | Fulton | Dec. 25, 1917 |
| 2,089,288 | Moorhouse | Aug. 10, 1937 |
| 2,368,182 | Vernet | Jan. 30, 1945 |
| 2,714,759 | Wangenheim | Aug. 9, 1955 |